US010764177B2

(12) United States Patent
Gafni et al.

(10) Patent No.: US 10,764,177 B2
(45) Date of Patent: Sep. 1, 2020

(54) EFFICIENT IMPLEMENTATION OF COMPLEX NETWORK SEGMENTATION

(71) Applicant: MELLANOX TECHNOLOGIES TLV LTD., Raanana (IL)

(72) Inventors: Barak Gafni, Campbell, CA (US); Aviv Kfir, Nili (IL); Benny Koren, Zichron Yaakov (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 68 days.

(21) Appl. No.: 16/252,760

(22) Filed: Jan. 21, 2019

(65) Prior Publication Data
US 2020/0236042 A1 Jul. 23, 2020

(51) Int. Cl.
*H04L 12/741* (2013.01)
*H04L 12/721* (2013.01)
*H04L 12/46* (2006.01)
*H04L 12/813* (2013.01)
*H04L 12/823* (2013.01)

(52) U.S. Cl.
CPC .......... *H04L 45/74* (2013.01); *H04L 12/4641* (2013.01); *H04L 45/34* (2013.01); *H04L 47/20* (2013.01); *H04L 47/32* (2013.01)

(58) Field of Classification Search
None
See application file for complete search history.

(56) References Cited

U.S. PATENT DOCUMENTS

| 6,651,096 | B1 | 11/2003 | Gai et al. |
| 7,024,515 | B1 | 4/2006 | Ruan et al. |
| 7,133,914 | B1 | 11/2006 | Holbrook et al. |
| 7,933,282 | B1 | 4/2011 | Gupta et al. |

(Continued)

OTHER PUBLICATIONS

Meiners et al., "Algorithmic Approaches to Redesigning TCAM-Based Systems", Proceedings of the 2008 ACM Sigmetrics International Conference on Measurement and Modeling of Computer Systems, vol. 36, issue 1, pp. 467-468, Annapolis, USA, Jun. 2-6, 2008.

(Continued)

*Primary Examiner* — Jamaal Henson
(74) *Attorney, Agent, or Firm* — Kilger & Associates Patent Attorneys Ltd (57) ABSTRACT

In one embodiment, a network device includes an interface to receive packets from sources in a network for forwarding to destinations in the network, the sources and destinations being assigned to groups, each packet including a source and destination identifier, a memory configured to store a source-group mapping table that maps source identifiers to source-groups, a destination-group mapping table that maps destination identifiers to destination-groups, and an intergroup access-control list that maps source-destination-group pairs to forwarding rules, and a single IC chip configured, for each packet, to find a source-group for the source identifier in the source-group mapping table, find a destination-group for the destination identifier in the destination-group mapping table, find a forwarding rule for a source-destination pair including the found source and destination-group in the intergroup access-control list, and forward or drop the packet according to the found forwarding rule.

12 Claims, 6 Drawing Sheets

(56) References Cited

U.S. PATENT DOCUMENTS

| | | | |
|---|---|---|---|
| 8,090,805 B1* | 1/2012 | Chawla | H04L 12/00 709/221 |
| 8,861,347 B2 | 10/2014 | Bloch et al. | |
| 9,237,158 B2 | 1/2016 | Smith | |
| 2004/0160903 A1* | 8/2004 | Gai | H04L 63/105 370/254 |
| 2005/0021752 A1 | 1/2005 | Marimuthu et al. | |
| 2005/0041665 A1* | 2/2005 | Weyman | H04L 45/44 370/390 |
| 2005/0047334 A1* | 3/2005 | Paul | H04L 12/5601 370/229 |
| 2005/0055573 A1* | 3/2005 | Smith | H04L 45/54 726/4 |
| 2005/0111453 A1* | 5/2005 | Mizutani | H04L 12/56 370/390 |
| 2006/0294297 A1 | 12/2006 | Gupta | |
| 2008/0165778 A1 | 7/2008 | Ertemalp | |
| 2008/0235234 A1 | 9/2008 | Beedubail et al. | |
| 2009/0217355 A1* | 8/2009 | Smith | H04L 45/54 726/3 |
| 2009/0259811 A1 | 10/2009 | Krishnan | |
| 2009/0300759 A1 | 12/2009 | Wang et al. | |
| 2009/0310504 A1 | 12/2009 | Engbersen et al. | |
| 2016/0255087 A1* | 9/2016 | Smith | H04L 45/7453 726/1 |
| 2016/0308766 A1* | 10/2016 | Register | H04L 43/028 |
| 2019/0097919 A1* | 3/2019 | Santos | H04L 45/28 |

OTHER PUBLICATIONS

Meiners et al., "TCAM SPliT: Optimizing Space, Power, and Throughput for TCAM-based Packet Classification Systems", Technical Report MSU-CSE-09-18, Michigan State University, USA, p. 1-14, Apr. 2009.

* cited by examiner

| SOURCE ID | SOURCE GROUP |
|---|---|
| A1 | A |
| A2 | A |
| A3 | A |
| B1 | B |
| B2 | B |
| B3 | B |
| C1 | C |
| C2 | C |
| C3 | C |

30

| DESTINATION ID | DESTINATION GROUP |
|---|---|
| A1 | A |
| A2 | A |
| A3 | A |
| B1 | B |
| B2 | B |
| B3 | B |
| C1 | C |
| C2 | C |
| C3 | C |

32

| KEY | | ACTION |
|---|---|---|
| SOURCE GROUP | DESTINATION GROUP | ALLOWED? |
| A | B | YES |
| A | C | YES |
| B | A | YES |
| * | * | NO |

EFFICIENT IMPLEMENTATION OF COMPLEX NETWORK SEGMENTATION

FIELD OF THE INVENTION

The present invention relates to segmented networks, and in particular, but not exclusively to, applying rules in segmented networks.

BACKGROUND

In modern private networks, such as data centers and intracompany networks, the infrastructure may be shared across multiple users and/or tenants. In situations where the network infrastructure is being shared there are various administrative and security concerns that need to be addressed to ensure virtual infrastructure segmentation. Segmentation is certainly relevant for different enterprises but even within the same enterprise segmentation may be desirable for administrative and security reasons.

U.S. Pat. No. 9,237,158 to Smith describes a method and apparatus for providing network security using role-based access control. A network device implementing such a method can include, for example, an access control list. Such an access control list includes an access control list entry, which, in turn, includes a user group field. Alternatively, a network device implementing Such a method can include, for example, a forwarding table that includes a plurality of forwarding table entries. In such a case, at least one of the forwarding table entries includes a user group field.

SUMMARY

There is provided in accordance with an embodiment of the present disclosure, a network device including an interface configured to receive a plurality of packets from sources disposed in a network for forwarding to destinations disposed in the network, the sources and the destinations being assigned to a plurality of groups, each packet of the plurality of packets including a source identifier and a destination identifier, a memory configured to store a source-group mapping table that maps source identifiers to source-groups, a destination-group mapping table that maps destination identifiers to destination-groups, and an intergroup access-control list that maps source-destination-group pairs to forwarding rules, and a single Integrated Circuit (IC) chip configured, for each packet received through the interface, to find a source-group for the source identifier in the source-group mapping table, find a destination-group for the destination identifier in the destination-group mapping table, find a forwarding rule for a source-destination pair including the found source-group and the found destination-group in the intergroup access-control list, and forward the packet through the interface or drop the packet the found forwarding rule.

Further in accordance with an embodiment of the present disclosure the single IC chip is configured to manage a timing of operations so that for each packet, a first time period in which the source-group is found and a second time period in which the destination-group is found at least partially overlap.

Still further in accordance with an embodiment of the present disclosure the intergroup access-control list allows bidirectional forwarding between two entities from different groups of the plurality of groups.

Additionally, in accordance with an embodiment of the present disclosure the intergroup access-control list allows unidirectional forwarding between two entities from different groups of the plurality of groups.

Moreover, in accordance with an embodiment of the present disclosure the network supports a multi-tenant infrastructure.

Further in accordance with an embodiment of the present disclosure the source identifier and the destination identifier are classified any one or more of the following a virtual extensible local area network (VXLAN) network identifier, a media access control (MAC) address from an Ethernet header, an Internet Protocol (IP) address from an Internet Protocol version 4 header, an IP address from an Internet Protocol version 6 header, and a virtual local area network (VLAN) identify from an Ethernet header.

There is also provided in accordance with another embodiment of the present disclosure, a access control method, including receiving a plurality of packets from sources disposed in a network for forwarding to destinations disposed in the network, the sources and the destinations being assigned to a plurality of groups, each packet of the plurality of packets including a source identifier and a destination identifier, storing a source-group mapping table that maps source identifiers to source-groups, a destination-group mapping table that maps destination identifiers to destination-groups, and an intergroup access-control list that maps source-destination-group pairs to forwarding rules, and performing the following for each packet in a single Integrated Circuit (IC) chip finding a source-group for the source identifier in the source-group mapping table, finding a destination-group for the destination identifier in the destination-group mapping table, finding a forwarding rule for a source-destination pair including the found source-group and the found destination-group in the intergroup access-control list, and forwarding or dropping the packet the found forwarding rule.

Still further in accordance with an embodiment of the present disclosure, the method includes managing a timing of operations so that for each packet, a first time period in which the source-group is found and a second time period in which the destination-group is found at least partially overlap.

Additionally, in accordance with an embodiment of the present disclosure the intergroup access-control list allows bidirectional forwarding between two entities from different groups of the plurality of groups.

Moreover, in accordance with an embodiment of the present disclosure the intergroup access-control list allows unidirectional forwarding between two entities from different groups of the plurality of groups.

Further in accordance with an embodiment of the present disclosure the network supports a multi-tenant infrastructure.

Still further in accordance with an embodiment of the present disclosure the source identifier and the destination identifier are classified any one or more of the following a virtual extensible local area network (VXLAN) network identifier, a media access control (MAC) address from an Ethernet header, an Internet Protocol (IP) address from an Internet Protocol version 4 header, an IP address from an Internet Protocol version 6 header, and a virtual local area network (VLAN) identify from an Ethernet header.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

In situations in which a network infrastructure is being shared among different groups of users there are various administrative and security concerns that need to be addressed to ensure virtual infrastructure segmentation. While full segmentation and separation between entities sharing the same resource is relatively straightforward to implement, more complex segmentation is frequently desired, such as between groups of users who might communicate with each other, sometimes bidirectionally and sometimes unidirectionally.

One method to manage segmentation is to use an access-control table to define whether communication between various sources and various destinations is permitted (white list) or forbidden (black list). The access-control table may form part of the routing tables in a switch or router, or another network device.

Although the assess-control table provides a segmentation function, storage and processing requirements associated with the table quickly become unwieldy and may grow rapidly with the growth in the number of users in the network. The following example illustrates use of an access-control table and how the table may become problematic in practice as the network grows.

Consider three departments (groups) A, B, and C sharing a data center with each department (group) having three users 1, 2, 3. In this example, there are a total of nine users, A1, A2, A3, B1, B2, B3, C1, C2, C3. The segmentation rules are as follows: A and B are allowed to communicate with each other, A and C are allowed to communicate with each other as well, but B and C are not allowed to communicate with each other.

In order to provide sufficient segmentation according to the above rules, a specific rule is required for each source-user and destination-user combination. Table 1 below provides an exemplary white-list for implementing the above rules. The list is already rather long, but as the number of users increases, the number of rules will increase rapidly according to 2×number of source users x number of destination users, which is polynomial growth with an order of two.

TABLE 1

| Key | | Action |
|---|---|---|
| Source ID | Destination ID | Allowed? |
| A1 | B1 | Yes |
| A1 | B2 | Yes |
| A1 | B3 | Yes |
| A1 | C1 | Yes |
| A1 | C2 | Yes |
| A1 | C3 | Yes |
| A2 | B1 | Yes |
| A2 | B2 | Yes |
| A2 | B3 | Yes |
| A2 | C1 | Yes |
| A2 | C2 | Yes |
| A2 | C3 | Yes |
| A3 | B1 | Yes |
| A3 | B2 | Yes |
| A3 | B3 | Yes |
| A3 | C1 | Yes |
| A3 | C2 | Yes |
| A3 | C3 | Yes |
| B1 | A1 | Yes |
| B2 | A1 | Yes |
| B3 | A1 | Yes |
| C1 | A1 | Yes |
| C2 | A1 | Yes |
| C3 | A1 | Yes |
| B1 | A2 | Yes |
| B2 | A2 | Yes |
| B3 | A2 | Yes |
| C1 | A2 | Yes |
| C2 | A2 | Yes |
| C3 | A2 | Yes |
| B1 | A3 | Yes |
| B2 | A3 | Yes |
| B3 | A3 | Yes |
| C1 | A3 | Yes |
| C2 | A3 | Yes |
| C3 | A3 | Yes |
| * | * | No |

In embodiments of the present invention, a system provides efficient segmentation including compressing the number of rule sets that are needed in order to enable a desired segmentation. As the numbers of sources and destinations increase, the number of rules increases only linearly. The advantages are particularly apparent when the segmentation becomes complex, with additional logic and relationships between the various users which can be classified into types of groups of users.

Rules are provided in an intergroup access-control list that lists rules on a group level without needing to list each rule between the various members (e.g., users) of each group.

Table 2 below provides an example of an intergroup access-control list for the three departments (groups) A, B, and C (previously described above) sharing the data center with each department (group) having three users 1, 2, 3. It can be clearly seen that the number of rules has been greatly reduced from 37 (included in table 1) to 5 (included in table 2).

TABLE 2

| Key | | Action |
|---|---|---|
| Source-group | Destination-group | Allowed? |
| A | B | Yes |
| A | C | Yes |

TABLE 2-continued

| Key | | |
|---|---|---|
| Source-group | Destination-group | Action Allowed? |
| B | A | Yes |
| C | A | Yes |
| * | * | No |

The system also provides a source-group mapping table that maps source identifiers (e.g., source users) to source-groups (e.g., departments), and a destination-group mapping table that maps destination identifiers (e.g., destination users) to destination-groups (e.g., departments).

The source-group mapping table and the destination-group mapping table are used to find the source-group and the destination-group for each packet, respectively based on a source ID and destination ID included in each packet header. Once the source-group and destination-group for a packet have been found, the source-destination-group pair for that packet is used in a lookup of the intergroup access-control list to determine whether communication from the source-group to the destination-group of the packet is allowed or denied.

Tables 3 and 4 below provides an example of a source-group mapping table and a destination-group mapping table, respectively, for the three departments (groups) A, B, and C sharing the data center, with each department (group) having three users 1, 2, 3.

TABLE 3

| Source ID | Source-group |
|---|---|
| A1 | A |
| A2 | A |
| A3 | A |
| B1 | B |
| B2 | B |
| B3 | B |
| C1 | C |
| C2 | C |
| C3 | C |

TABLE 4

| Destination ID | Destination-group |
|---|---|
| A1 | A |
| A2 | A |
| A3 | A |
| B1 | B |
| B2 | B |
| B3 | B |
| C1 | C |
| C2 | C |
| C3 | C |

In accordance with the above tables (tables 2-4), it can be seen that the number of table entries increases only linearly approximately based on 2×number of users+2×number of groups.

Benefits of embodiments of the present invention, relate not only to the reduced number of rules, but also to the foot print of each rule by having fewer bits that a rule needs to be matched on.

In some embodiments, for performance reasons, such as speed at which packets are processed and forwarded, a single Integrated Circuit (IC) chip, such as an Application Specific Integrated Circuit (ASIC) chip, processes the determination of the source and destination-group from the packet header as well as lookup of the source-destination-group pair in the intergroup access-control list to determine whether communication between the source-group and destination-group is allowed or denied. If the table lookup is divided among multiple IC chips, the packet throughput may be insufficient in many network environments resulting in a congested network and higher latency.

Combining the functionality into a single IC chip enables the packets to be processed while confirming to network latency requirements. The IC chip is hard-wired logic device dedicated to performing the lookup in tables 2-4 for the packets being processed as well other functionality described below in the example embodiments.

In some network situations, such as hyperconverged deployments or forwarding traffic between two servers on the same rack, implementing the ingress and egress classification, as well as applying rules to the groups in a single IC provides a compact and efficient solution, and in some cases the only viable solution.

In some embodiments the determination of the source-group and the destination-group from the packet header may be performed in parallel to further improve speed at which packets are processed.

The segmentation system may be applied when a packet header includes any suitable source and destination ID for example, but not limited to, a virtual extensible local area network (VXLAN) network identifier (VNI) from a VXLAN header, a media access control (MAC) address from an Ethernet header, an Internet Protocol (IP) address from an IP version 4 (IPv4) header, an IP address from an IP version 6 (IPv6) header, or a virtual local area network (VLAN) identify from an Ethernet header.

The segmentation may be used to apply bidirectional and/or unidirectional rules. An example of unidirectional rules is as follows, group A can data send to groups B and C, while groups B and C cannot send data to group A. An example of both bidirectional and unidirectional rules is as follows, groups A and B can communicate bidirectionally with each other, while group A can send data to group C while group C cannot send data to group A.

The segmentation system may be implemented in any suitable network device for example, but not limited to a firewall, a switch, or a router.

System Description

Figure 1:
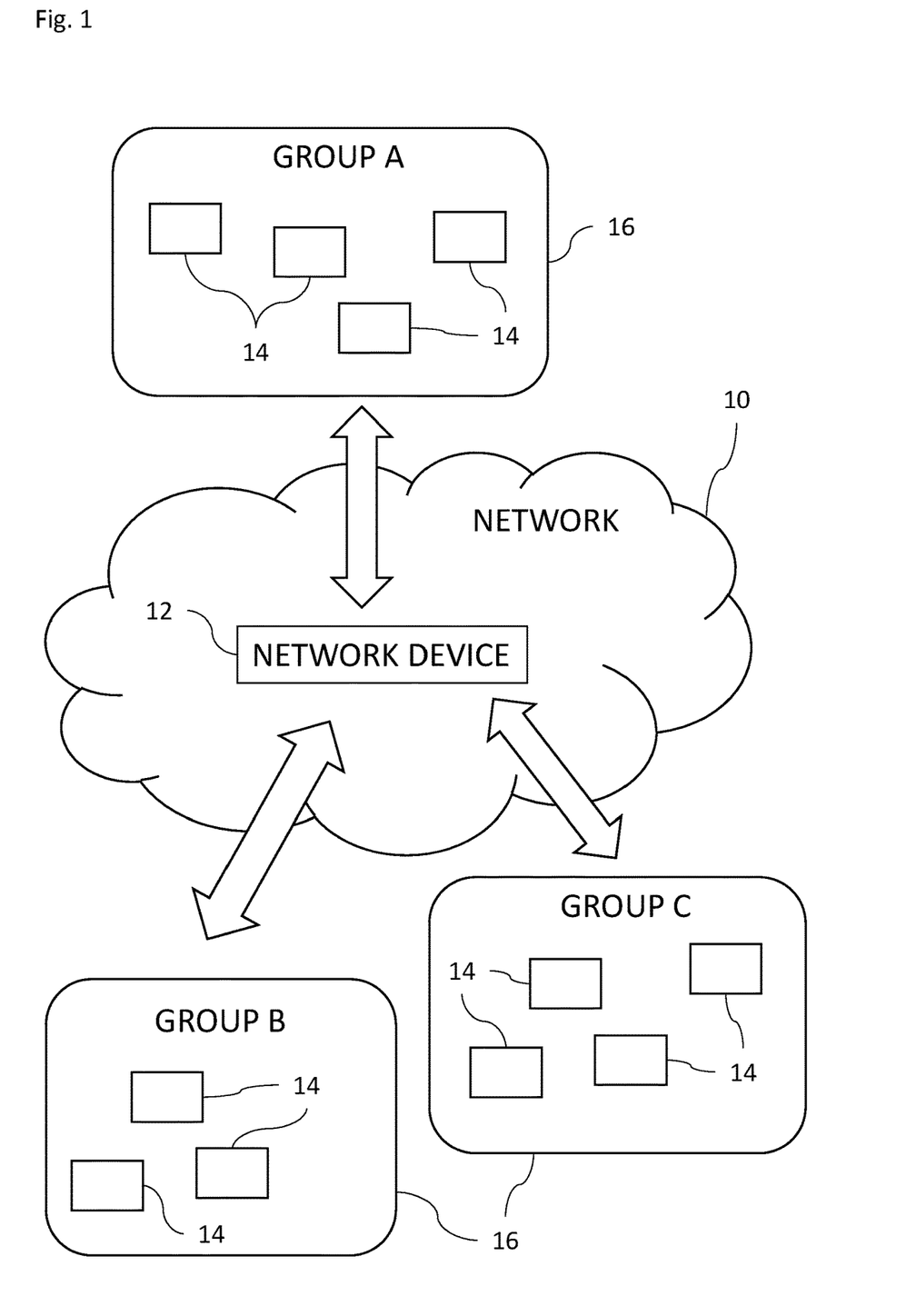
FIG. 1 is a block diagram view of various entities in a network constructed and operative in accordance with an embodiment of the present invention.

Reference is now made to FIG. 1, which is a block diagram view of various entities in a network 10 in accordance with an embodiment of the present invention. The network 10 includes various network devices including a network device 12 to forward network packets between entities 14 within the network 10. The network device 12 may be implemented as a physical or a virtual network device. The entities 14 may be classified according to groups 16. FIG. 1 shows three exemplary groups 16, group A, group B, and group C. The network 10 may be a segmented network, which is segmented according to the groups 16. The segmented network may support a multi-tenant infrastructure, for example, but not limited to, in a data center or in a cloud implementation.

In some embodiments, each entity 14 may be a user or device in the network 10. For example, different departments in a corporation may be represented by the groups 16, or different corporation may be represented by the groups 16.

In other embodiments, each entity 14 may include multiple users or devices so that each group 16 includes a plurality of sub-groups. For example, different corporations may be represented by the different groups 16 and different departments in each corporation may be represented by the entities 14 where each entity 14 includes a plurality of users or devices.

Figure 2:
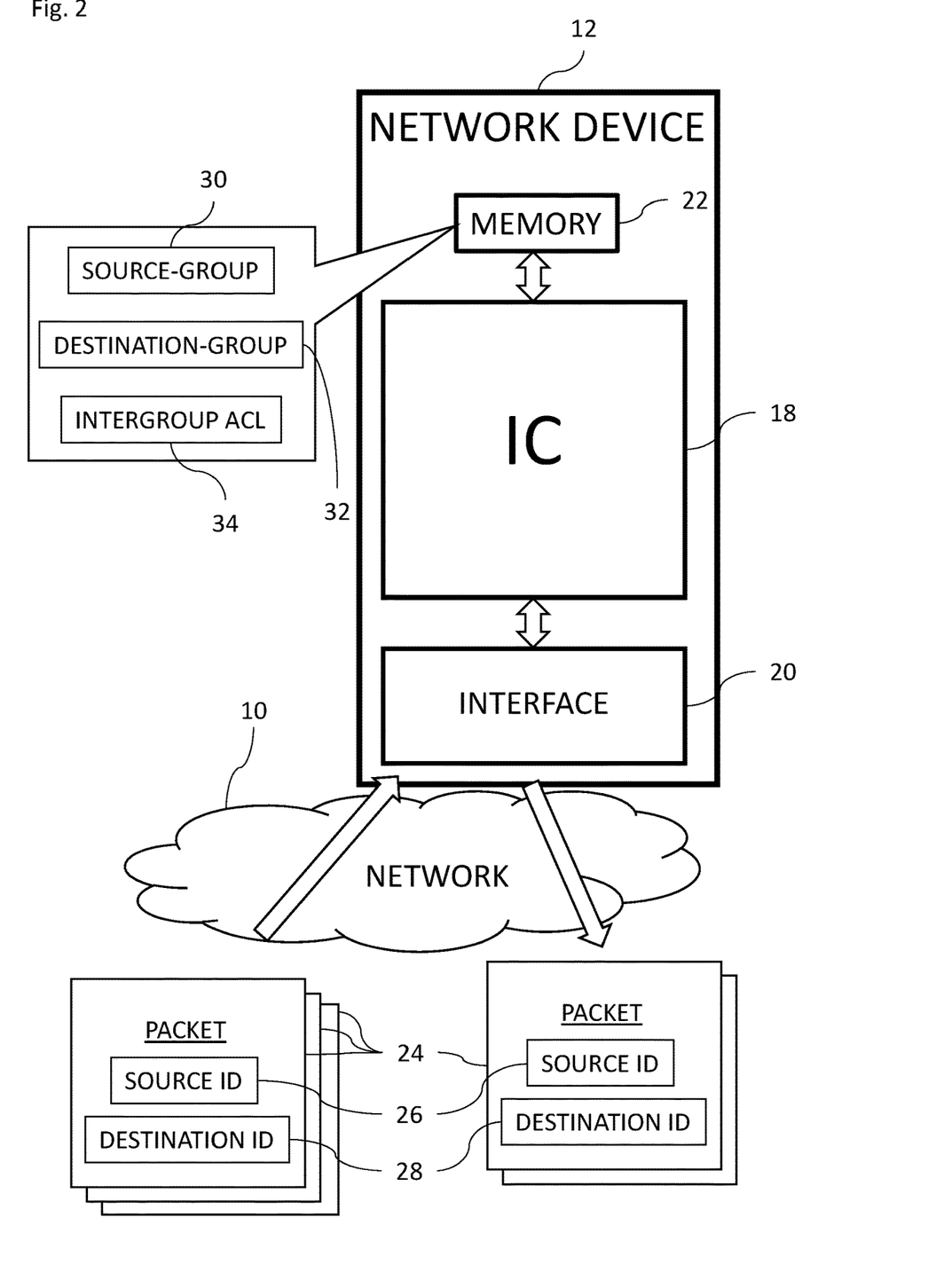
FIG. 2 is a block diagram view of a network device in the network of FIG. 1 constructed and operative in accordance with an embodiment of the present invention.

Reference is now made to FIG. 2, which is a block diagram view of the network device 12 in the network 10 of FIG. 1 constructed and operative in accordance with an embodiment of the present invention.

The network device 12 includes an Integrated Circuit (IC) chip 18 (e.g., an Application Specific Integrated Circuit (ASIC) chip), an interface 20 and a memory 22. The network device 12 may include other elements that are not described herein.

The IC chip 18 is described in more detail with reference to FIG. 4. The IC chip 18 is generally the only IC chip in the network device 12 providing the functionality described with reference to FIG. 4. A single IC chip is particularly efficient at performing the processing tasks and in some network configurations, more than one IC chip may result in too much latency in the network device 12.

The interface 20 is configured to receive a plurality of packets 24 from sources (e.g., selected from the entities 14 of FIG. 1) disposed in the network 10 for forwarding to destinations (e.g., selected from the entities 14) disposed in the network 10. The sources and the destinations are assigned to the groups 16 (FIG. 1) (according the allocation of the entities 14 to the groups 16). The packets 24 received by the interface 20 may be forwarded to the IC chip 18 for further processing.

Each packet 24 includes a source identifier 26 and a destination identifier 28. The source identifier 26 and the destination identifier 28 may be classified according to, any one or more of the following, by way of example only: a virtual extensible local area network (VXLAN) network identifier (VNI), a media access control (MAC) address from an Ethernet header, an Internet Protocol (IP) address from an Internet Protocol version 4 header, an IP address from an Internet Protocol version 6 header, and a virtual local area network (VLAN) identify from an Ethernet header. By way of example, the source identifier 26 and the destination identifier 28 may be VNIs in a VXLAN header that are being used by users, while a department may include multiple VNIs. Any other suitable source identifier 26 and destination identifier 28 may alternatively be used.

The memory 22 may be an integral part of the IC chip 18, for example, in a system-on-chip design. In some embodiments, the memory 22 may be a separate unit from the IC chip 18 but on the same chip as the IC chip 18. In other embodiments, the memory 22 may be on a separate chip to the IC chip 18.

The memory 22 is configured to store several routing tables including: a source-group mapping table 30 that maps source identifiers 26 to source-groups; a destination-group mapping table 32 that maps destination identifiers to destination-groups; and an intergroup access-control list 34 that maps source-destination-group pairs to forwarding rules.

The source-groups and the destination-groups are groups as classified by the groups 16 described in FIG. 1. The source-groups and the destination-groups have been assigned different names in the source-group mapping table 30, the destination-group mapping table 32, and the intergroup access-control list 34 in order to allow distinguishing between the group 16 (i.e., the source-group) of the source identifier 26 and the group 16 (i.e., the destination-group) of the destination identifier 28 included in the header of one of the packets 24.

The intergroup access-control list 34 may allow (or deny) bidirectional forwarding between entities 14 from different groups 16. Additionally, or alternatively, the intergroup access-control list 34 may allow (or deny) unidirectional forwarding between entities 14 from different groups 16.

The source-group mapping table 30, the destination-group mapping table 32, and the intergroup access-control list 34 are described in more detail below with reference to FIG. 3 which shows exemplary tables 30, 32, 34 according to a simplified example including three groups 16 with three entities 14 per group 16.

Figure 3:
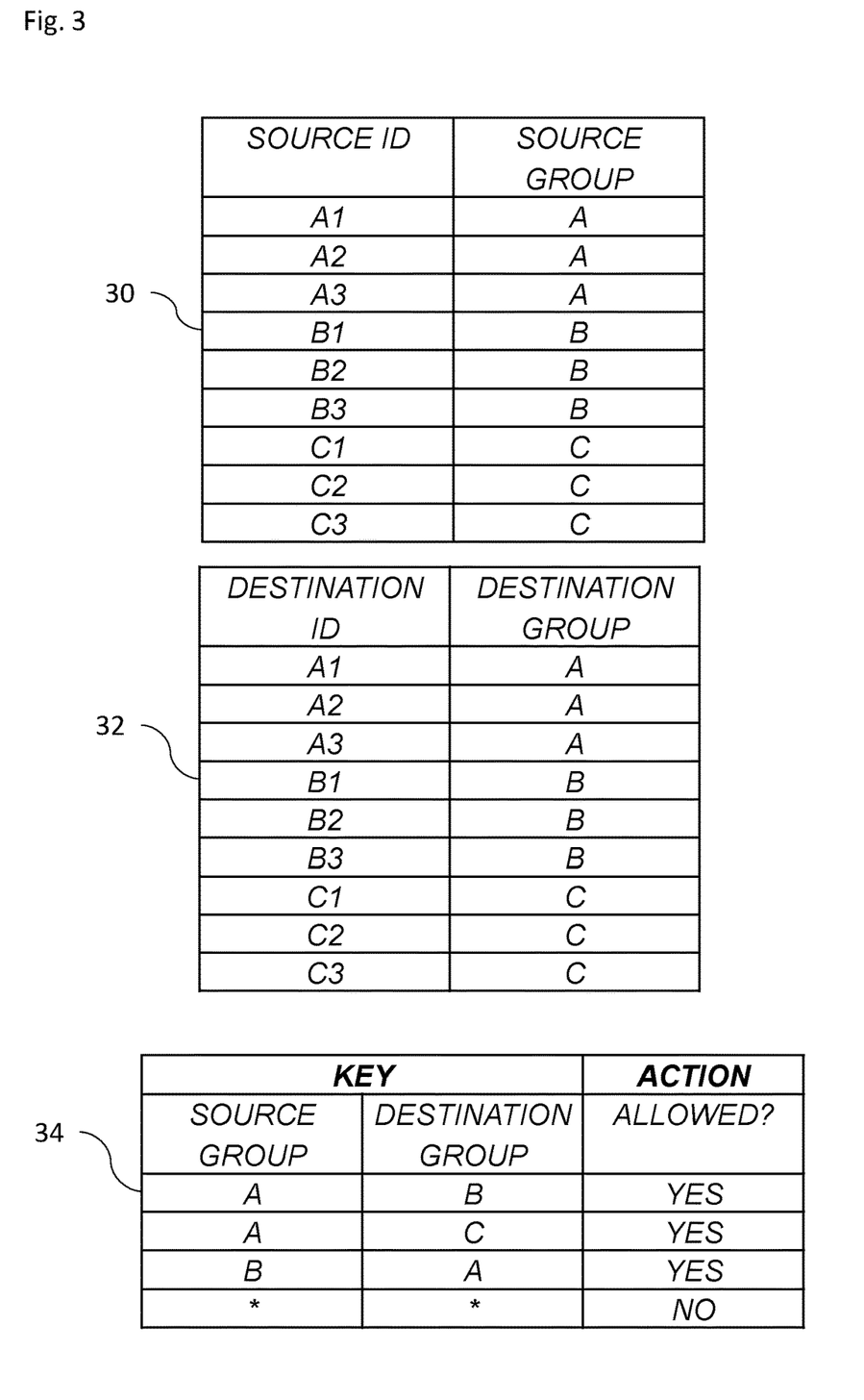
FIG. 3 is a view of a plurality of exemplary tables for use in the network device of FIG. 2.

Reference is now made to FIG. 3, which is a view of a plurality of exemplary tables 30, 32, 34 for use in the network device 12 of FIG. 2.

The source-group mapping table 30, the destination-group mapping table 32, and the intergroup access-control list 34 shown in FIG. 3 are based on the following example. Consider three departments (groups) A, B, and C sharing a data center with each department (group) having three users 1, 2, 3. In this example, there are a total of nine users, A1, A2, A3, B1, B2, B3, C1, C2, C3. The segmentation rules are as follows: A and B are allowed to communicate with each other bidirectionally, A and C are allowed to communicate with each other as well but only unidirectionally from A to C, whereas B and C are not allowed to communicate with each other.

By way of a first example, a first packet 24 is received by the network device 12. The source identifier 26 of the first packet 24 is equal to A1 and the destination identifier 28 of the first packet 24 is equal to C3. The IC chip 18 looks up the source identifier 26 of A1 in the source-group mapping table 30 yielding the source-group of A. The IC chip 18 looks up the destination identifier 28 of C3 in the destination-group mapping table 32 yielding the destination-group of C. Using the source-destination group pair of A-C, the IC chip 18 looks up in the intergroup access-control list 34 whether communication is allowed from A to C. The intergroup access-control list 34 yields a "YES" which indicates that communication is allowed from A to C. The IC chip 18 therefore forwards the first packet to C3.

By way of a second example, a second packet 24 is received by the network device 12. The source identifier 26 of the second packet 24 is equal to C3 and the destination identifier 28 of the second packet 24 is equal to A1. The IC chip 18 looks up the source identifier 26 of C3 in the source-group mapping table 30 yielding the source-group of C. The IC chip 18 looks up the destination identifier 28 of A1 in the destination-group mapping table 32 yielding the destination-group of A. Using the source-destination group pair of C-A, the IC chip 18 looks up in the intergroup access-control list 34 whether communication is allowed from C to A. The intergroup access-control list 34 yields a "NO" as the source-destination group pair C-A is not explicitly listed in the intergroup access-control list 34 and therefore the wildcard rule "* *" applies indicating that communication is not allowed from C to A. The IC chip 18 therefore drops the second packet.

By way of a third example, a fourth and fifth packet 24 are received by the network device 12. The fourth packet is from A3 to B2 whereas the fifth packet is from B2 to A3. As bidirectional communication is allowed between groups A and B, both the fourth packet and the fifth packet are forwarded to their respective destinations.

By way of a fourth example, packets between B1 and C3 in any direction are dropped according to the "* *" rule given in the intergroup access-control list 34.

Figure 4:
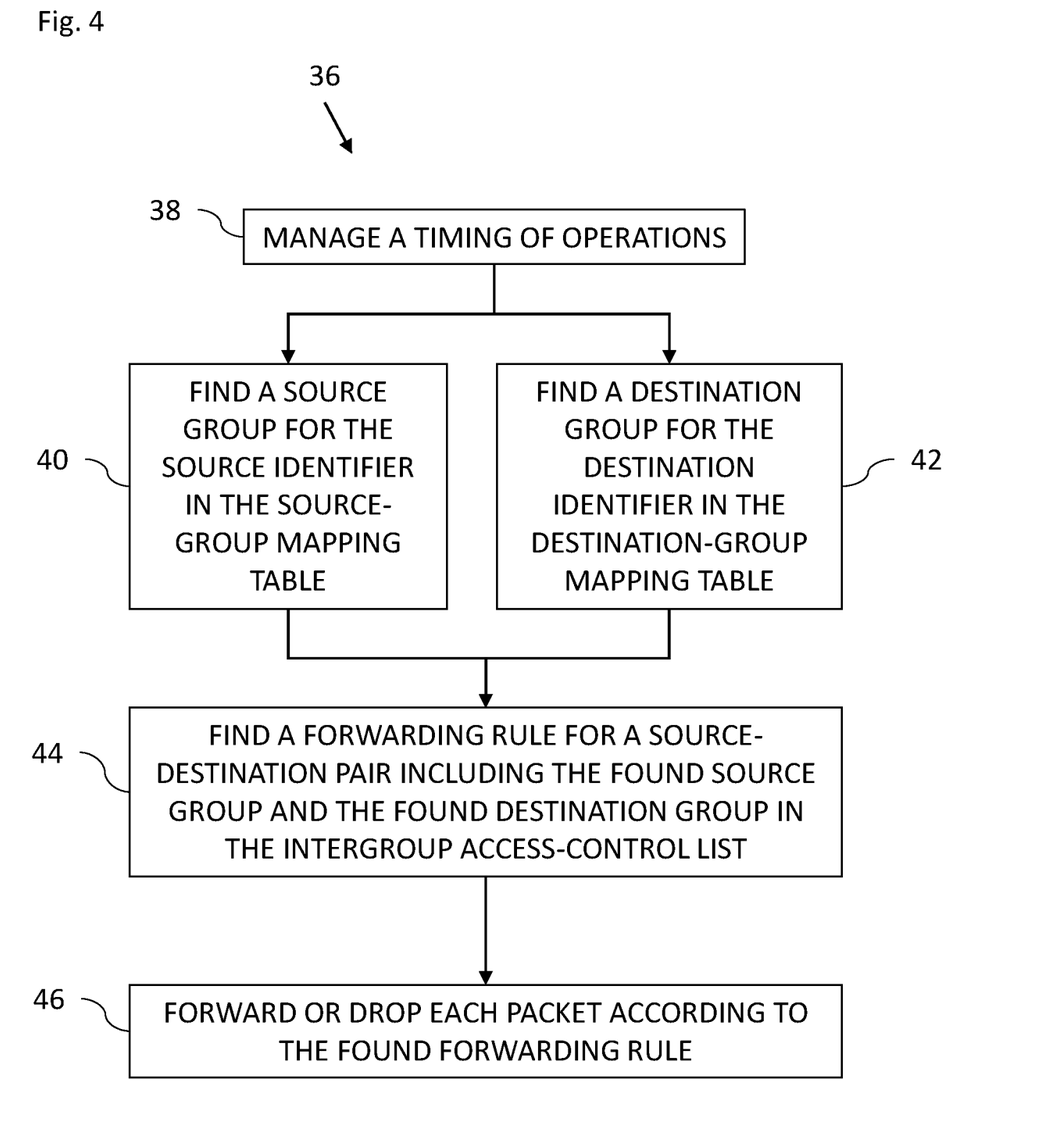
FIG. 4 is a flowchart including exemplary steps in a method of operation of the network device of FIG. 2.

Reference is now made to FIG. 4, which is a view of a flowchart 36 including exemplary steps in a method of operation of the network device 12 of FIG. 2. Reference is also made to FIG. 2.

The single IC chip 18 is configured to perform the following steps described with reference to blocks 38-46 of FIG. 4 for each packet 24 received through the interface 20.

Other packets (other than the packets 24) may also be received by the interface 20 without being processed by the IC chip 18 according to the steps listed below.

The single IC chip 18 is configured to manage (block 38) a timing of operations so that for each packet 24, a first time period in which the source-group is found (described below with reference to the step of block 40) and a second time period in which the destination-group is found (described below with reference to the step of block 42) at least partially overlap thereby achieving some level of parallel processing. Parallel processing of the steps of blocks 38 and 40 may provide enhanced resource usage and packet throughput in certain implementations of the network device 12. In some embodiments, the steps of blocks 40 and 42 may be performed sequentially in any suitable order.

The single IC chip 18 is configured to find (block 40) a source-group for the source identifier 26 (of one of the packets 24) in the source-group mapping table 30. The single IC chip 18 is configured to find (block 42) a destination-group for the destination identifier 28 (of that packet 24) in the destination-group mapping table 32. The found source-group and the found destination-group are generally written to two different registers in the memory 22 or any other suitable memory by the single IC chip 18.

The single IC chip 18 is configured to read the found source-group and the destination group from the registers and find (block 44) a forwarding rule for a source-destination pair including the found source-group and the found destination-group (for that packet 24) in the intergroup access-control list 34. The single IC chip 18 is configured to forward the packet through the interface 20 or drop (block 46) the packet 24 according to the found forwarding rule of the packet 24.

Figure 5:
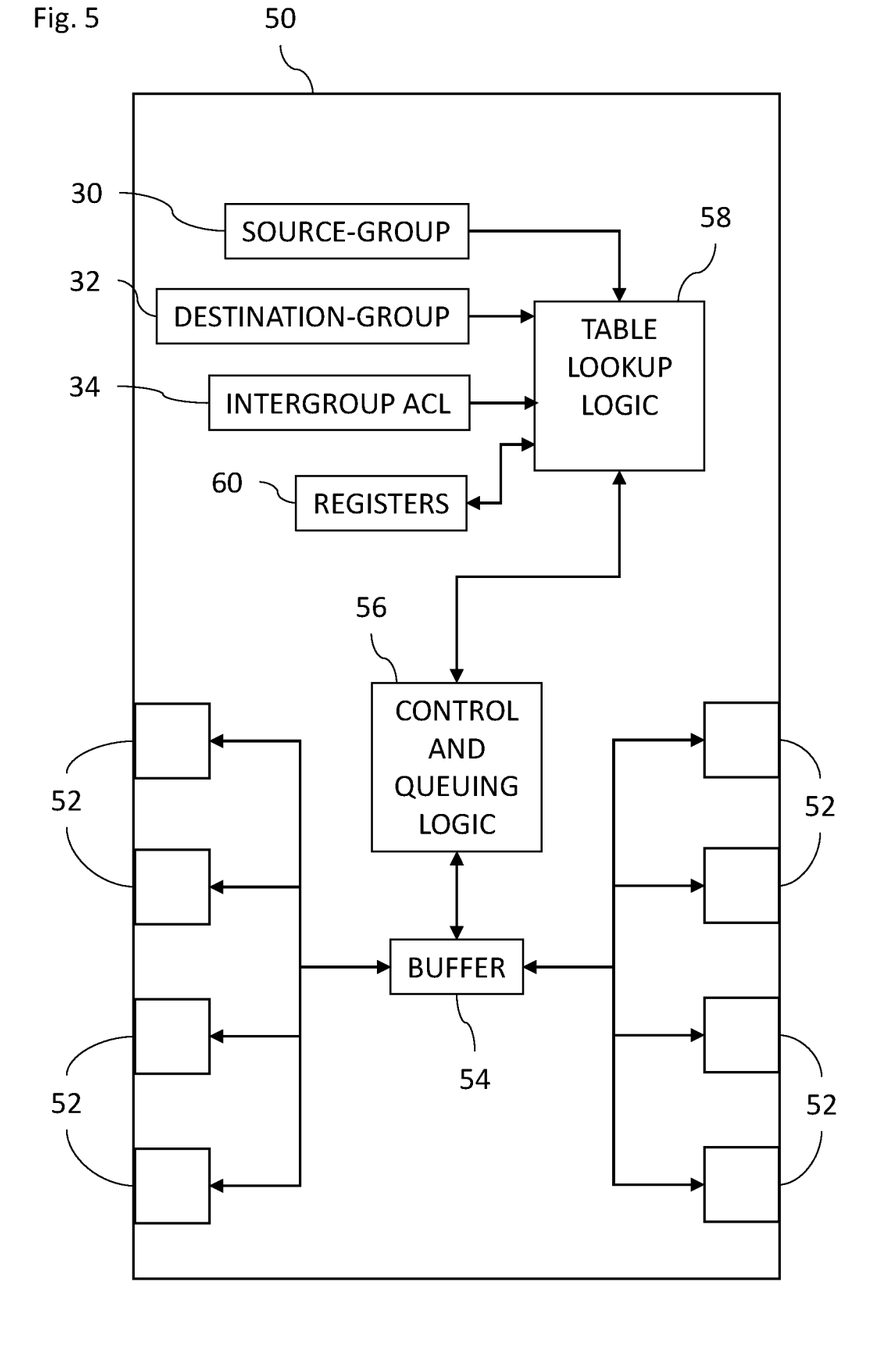
FIG. 5 is a block diagram view of a network device in the network of FIG. 1 constructed and operative in accordance with an alternative embodiment of the present invention.

Reference is now made to FIG. 5, which is a block diagram view of a network device 50 in the network 10 of FIG. 1 constructed and operative in accordance with an alternative embodiment of the present invention. The network device 50 includes a plurality of ports 52 to receive and forward the packets 24 (FIG. 2). The received packets 24 are stored by a buffer 54. The network device 50 includes control and queuing logic 56 to schedule the packets 24 for forwarding and drop the packets 24 that need to be dropped. The control and queuing logic 56 also controls a table lookup logic 58 which looks up the source and destination group in the source-group mapping table 30 and the destination-group mapping table 32, respectively. The table lookup logic 58 stores the found source and destination group in registers 60. The table lookup logic 58 retrieves the stored source and destination group from the registers 60 and performs a lookup of the intergroup access-control list 34 to determine if the current packet 24 should be forwarded or dropped. The decision of whether to forward or drop the packet 24 is sent by the table lookup logic 58 to the control and queuing logic 56. The buffer 54, the control and queuing logic 56, the table lookup logic 58, and the registers 60 are generally disposed on a single IC.

Figure 6:
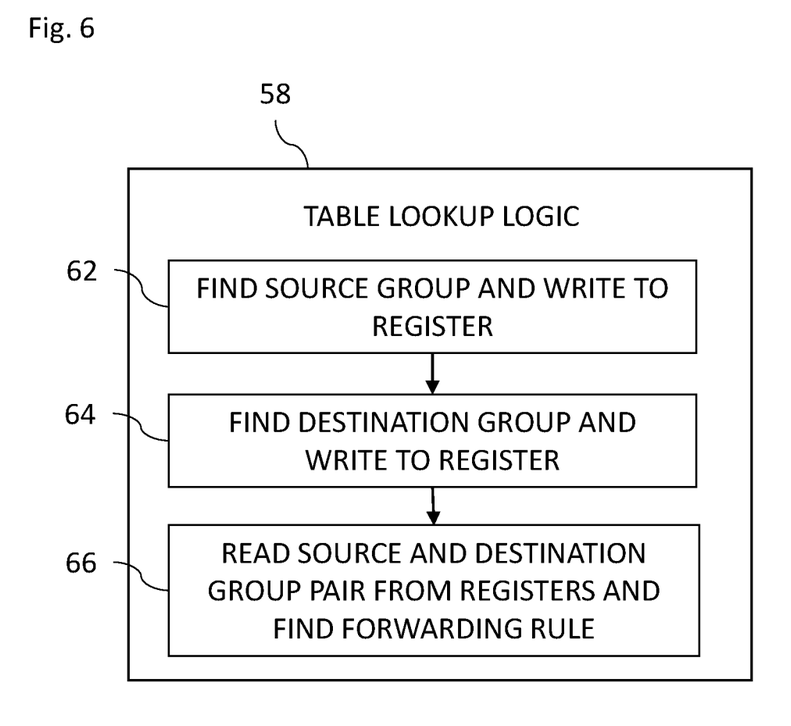
FIG. 6 is a block diagram view of a pipeline in the table lookup logic of the network device of FIG. 5.

Reference is now made to FIG. 6, which is a block diagram view of a pipeline in the serial table lookup logic of the network device 50 of FIG. 5. The table lookup logic 58 is configured to: find (block 62) the source group and write the found source group to one of the registers 60 (FIG. 5); find (block 64) the destination group and write the found destination group to one of the registers 60 (FIG. 5); and read the source and destination group pair from the registers 60 and find (block 66) a forwarding rule in the intergroup access-control list 34. The step of block 62 and the step of block 64 are performed in series (i.e., sequentially).

Figure 7:
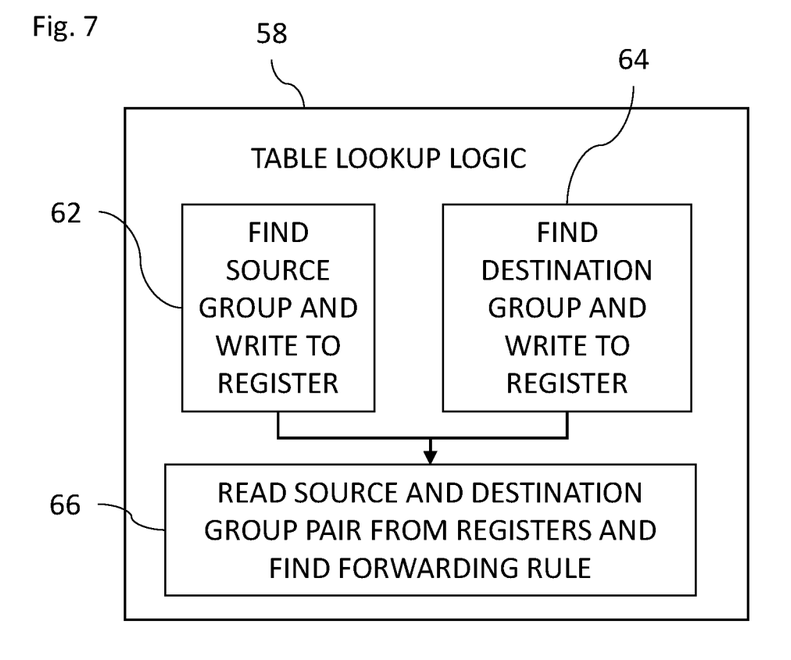
FIG. 7 is a block diagram view of an alternative pipeline in the table lookup logic of the network device of FIG. 5.

Reference is now made to FIG. 7, which is a block diagram view of an alternative pipeline in the table lookup logic of the network device 50 of FIG. 5. FIG. 7 shows that the table lookup logic 58 is configured to perform the steps of the blocks 62, 64 and 66, with the steps of the blocks 62, 64 being performed in parallel.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A network device comprising:
    an interface configured to receive a plurality of packets from sources disposed in a network for forwarding to destinations disposed in the network, the sources and the destinations being assigned to a plurality of groups, each packet of the plurality of packets including a source identifier and a destination identifier;
    a memory configured to store: a source-group mapping table that maps source identifiers to source-groups; a destination-group mapping table that maps destination identifiers to destination-groups; and an intergroup access-control list that maps source-destination-group pairs to forwarding rules; and
    a single Integrated Circuit (IC) chip configured, for each packet received through the interface, to:
        find a source-group for the source identifier in the source-group mapping table;
        find a destination-group for the destination identifier in the destination-group mapping table;
        find a forwarding rule for a source-destination pair including the found source-group and the found destination-group in the intergroup access-control list; and
        forward the packet through the interface or drop the packet according to the found forwarding rule.

2. The device according to claim 1, wherein the single IC chip is configured to manage a timing of operations so that for each packet, a first time period in which the source-group is found and a second time period in which the destination-group is found at least partially overlap.

3. The device according to claim 1, wherein the intergroup access-control list allows bidirectional forwarding between two entities from different groups of the plurality of groups.

4. The device according to claim 1, wherein the intergroup access-control list allows unidirectional forwarding between two entities from different groups of the plurality of groups.

5. The device according to claim 1, wherein the network supports a multi-tenant infrastructure.

6. The device according to claim 1, wherein the source identifier and the destination identifier are classified according to any one or more of the following: a virtual extensible local area network (VXLAN) network identifier, a media access control (MAC) address from an Ethernet header, an Internet Protocol (IP) address from an Internet Protocol version 4 header, an IP address from an Internet Protocol version 6 header, and a virtual local area network (VLAN) identify from an Ethernet header.

7. An access control method, comprising:
receiving a plurality of packets from sources disposed in a network for forwarding to destinations disposed in the network, the sources and the destinations being assigned to a plurality of groups, each packet of the plurality of packets including a source identifier and a destination identifier;
storing: a source-group mapping table that maps source identifiers to source-groups; a destination-group mapping table that maps destination identifiers to destination-groups; and an intergroup access-control list that maps source-destination-group pairs to forwarding rules; and
performing the following for each packet in a single Integrated Circuit (IC) chip:
finding a source-group for the source identifier in the source-group mapping table;
finding a destination-group for the destination identifier in the destination-group mapping table;
finding a forwarding rule for a source-destination pair including the found source-group and the found destination-group in the intergroup access-control list; and
forwarding or dropping the packet according to the found forwarding rule.

8. The method according to claim 7, further comprising managing a timing of operations so that for each packet, a first time period in which the source-group is found and a second time period in which the destination-group is found at least partially overlap.

9. The method according to claim 7, wherein the intergroup access-control list allows bidirectional forwarding between two entities from different groups of the plurality of groups.

10. The method according to claim 7, wherein the intergroup access-control list allows unidirectional forwarding between two entities from different groups of the plurality of groups.

11. The method according to claim 7, wherein the network supports a multi-tenant infrastructure.

12. The method according to claim 7, wherein the source identifier and the destination identifier are classified according to any one or more of the following: a virtual extensible local area network (VXLAN) network identifier, a media access control (MAC) address from an Ethernet header, an Internet Protocol (IP) address from an Internet Protocol version 4 header, an IP address from an Internet Protocol version 6 header, and a virtual local area network (VLAN) identify from an Ethernet header.

* * * * *